(12) United States Patent
Ionescu

(10) Patent No.: US 7,150,007 B2
(45) Date of Patent: Dec. 12, 2006

(54) UNIVERSAL ROUTINE FOR REVIEWING AND EXERCISING SOFTWARE OBJECTS

(75) Inventor: Radu V. Ionescu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 454 days.

(21) Appl. No.: 09/871,345

(22) Filed: May 30, 2001

(65) Prior Publication Data

US 2002/0066079 A1 May 30, 2002

Related U.S. Application Data

(60) Provisional application No. 60/231,651, filed on Sep. 11, 2000.

(51) Int. Cl.
 *G06F 9/44* (2006.01)
 *G06F 9/00* (2006.01)
(52) U.S. Cl. .................. 717/125; 717/131; 715/762
(58) Field of Classification Search ............. 717/124, 717/125, 127, 131; 702/108, 117, 119; 712/220, 712/227; 707/103 R
See application file for complete search history.

(56) References Cited

U.S. PATENT DOCUMENTS

| | | | | |
|---|---|---|---|---|
| 5,321,838 A * | 6/1994 | Hensley et al. | .............. | 717/125 |
| 5,537,630 A * | 7/1996 | Berry et al. | .................. | 345/763 |
| 5,590,330 A * | 12/1996 | Coskun et al. | .............. | 717/126 |
| 5,737,609 A * | 4/1998 | Reed et al. | .................. | 717/126 |
| 5,794,043 A * | 8/1998 | Kolb | ........................... | 717/124 |
| 6,067,639 A * | 5/2000 | Rodrigues et al. | ............ | 714/38 |
| 6,407,761 B1 * | 6/2002 | Ching et al. | ................. | 715/835 |
| 6,421,822 B1 * | 7/2002 | Pavela | ........................ | 717/125 |
| 6,505,342 B1 * | 1/2003 | Hartmann et al. | .......... | 717/104 |
| 6,519,605 B1 * | 2/2003 | Gilgen et al. | ........... | 707/103 R |
| 6,523,169 B1 * | 2/2003 | Glunz | ........................ | 717/124 |
| 6,633,888 B1 * | 10/2003 | Kobayashi | .............. | 707/103 R |
| 7,028,223 B1 * | 4/2006 | Kolawa et al. | ................ | 714/38 |
| 2002/0073404 A1 * | 6/2002 | Sokolov et al. | ............. | 717/131 |

OTHER PUBLICATIONS

Microsoft Corporation, "Comparing Microsoft Transaction Server to Enterprise JavaBeans", 1999, archived online Apr. 1999 at <http://web.archive.org/web/19990429003650/http://www.microsoft.com/com/wpaper/mts-ejb.asp>, accessed Jun. 10, 2004.*

(Continued)

*Primary Examiner*—Tuan Dam
*Assistant Examiner*—J. Derek Rutten
(74) *Attorney, Agent, or Firm*—Perkins Coie LLP

(57) ABSTRACT

A universal routine is controlled through a user interface, or through an engine command processor when using a recorded file, and implements logical operations for reviewing and testing objects in the program. Through the user interface the reviewer selects objects to be exercised and exercises them with selected methods and parameters. The object under review is cocreated so that the cocreated object is exercised. The reviewer selects parameters, if any, for use by the selected method in the object when the selected method is invoked. The selected method on the object is called; the parameters for the method are retrieved and the method is invoked. In effect the object under review is sent a message containing a selected method to be performed with selected parameters. The result of exercising the object with the selected method and selected parameters is logged for review. A dialog between the user/reviewer and the objects under test continues until all objects to be reviewed have been exercised.

17 Claims, 4 Drawing Sheets

OTHER PUBLICATIONS

Amie L. Souter, Lori L. Pollock, "OMEN: A strategy for testing object-oriented software", Aug. 2000, Proceedings of the ISSTA '00, ACM SIGSOFT Software Engineering Notes, vol. 25 Issue 5, ISBN:1-58113-266-2, pp. 49-59.*

Yu-Seung Ma; Seung-Uk Oh; Doo-Hwan Bae; Yong-Rae Kwon, "Framework for third party testing of component software", Dec. 2001, Software Engineering Conference, 2001. APSEC 2001. Eighth Asia-Pacific, pp. 431-434.*

Morris S. Johnson, "A survey of testing techniques for object-oriented systems", Nov. 1996, Proceedings of the 1996 conference of the Centre for Advanced Studies on Collaborative research, 8 pages.*

Gail C. Murphy, Paul Townsend, Pok Sze Wong, "Experiences with cluster and class testing", Sep. 1994, Communications of the ACM, vol. 37 Issue 9, pp. 39-47.*

Thomas J. Cheatham, Lee Mellinger, "Testing object-oriented software systems", Jan. 1990, Proceedings of the 1990 ACM annual conference on Cooperation, pp. 161-165, ISBN:0-89791-348-5.*

Nancy S. Eickelmann, Debra J. Richardson, "An evaluation of software test environment architectures", May 1996, Proceedings of the 18th international conference on Software engineering, pp. 353-364.*

Labiche et al., "Testing levels for object-oriented software", 2000, Proceedings of the 22nd Intl. Conference on Software Engineering, pp. 136-145.*

Morris S. Johnson, "A survey of testing techniques for object-oriented systems", Nov. 1996, Proceedings of the 1996 conference of the Centre for Advanced Studies on Collaborative research, 8 pages.*

* cited by examiner

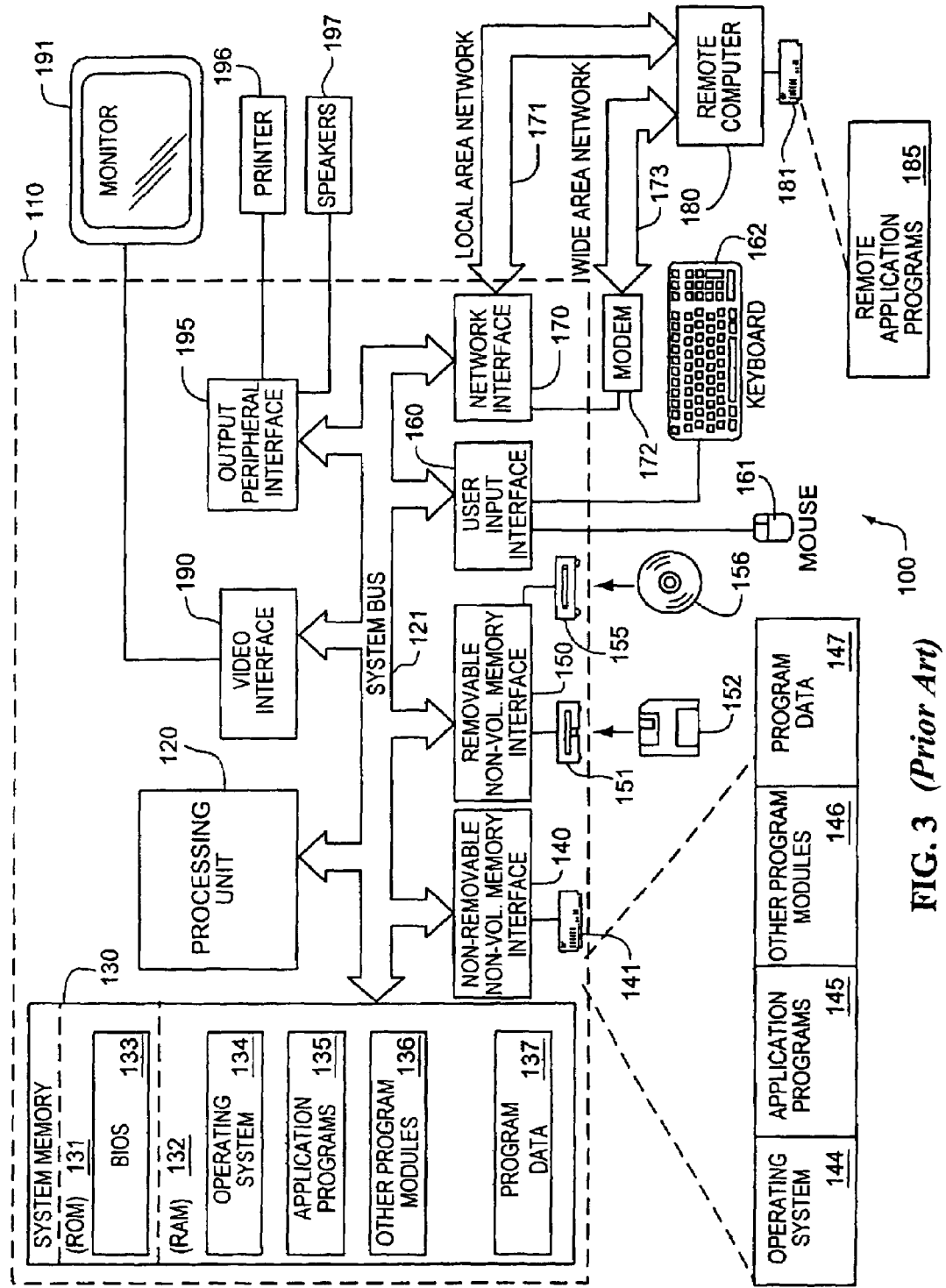
FIG. 3 *(Prior Art)*

UNIVERSAL ROUTINE FOR REVIEWING AND EXERCISING SOFTWARE OBJECTS

CROSS-REFERENCE TO RELATED APPLICATION

This application claims the benefit of U.S. Provisional Application No. 60/231,651 filed Sep. 11, 2000 and entitled "OBJECT BROWSER USING TYPE LIBRARIES".

TECHNICAL FIELD

This invention relates to reviewing and testing software objects in a program. More particularly, this invention relates to testing objects in a program by selecting software objects for review and exercising a selected software object with an assortment of methods and parameters selectable by the user.

BACKGROUND OF THE INVENTION

The development of new computer programs or software has been greatly advanced both as to reliability and speed of development by the advent of object-oriented technology, i.e. object programming. In object programming, an object is a software package containing methods and data elements on which the methods operate. The methods in the object operate on the data elements to produce a desired result. A computer program may be organized into objects that together perform the desired operations of the program. To work together the objects send messages to each other. The messages specify a receiver object, a method to be performed by the receiver object and data to be used by the receiver object when performing the method. The receiver object may respond with a message to the sending object. Exemplary program languages for writing object-oriented programs include C++ and Smalltalk.

Another advance in the writing of computer programs has been the Component Object Module (COM) programming system developed by Microsoft Corporation. COM objects are designed to be standard building components useful for building many types of programs. Just as electrical circuit elements such as resistors, capacitors, inductors and active devices are components in circuit designs, so also COM objects are components in program designs.

A problem that remains in the development of programs is the review and testing of objects or COM objects. To test objects in the program, the developer will typically spend a great deal of time writing code to test each object with an assortment of messages containing methods and parameters to exercise the object. The testing and debugging of the objects in a new program may take a significant amount of time after the program is written.

SUMMARY OF THE INVENTION

In accordance with the present invention, the above and other problems in testing programs are solved by a universal routine controlled through a user interface and implementing logical operations for reviewing and testing objects in the program. Through the user interface the reviewer selects objects to be exercised and exercises them with selected methods and parameters. The object under review is cocreated so that the cocreated object is exercised. The reviewer selects parameters, if any, for use by the selected method in the object when the selected method is invoked. The selected method on the object is called; the parameters for the method are retrieved and the method is invoked. In effect the object under review is sent a message containing a selected method to be performed with selected parameters. The result of exercising the object with the selected method and selected parameters is logged for review. A dialog between the user/reviewer and the objects under test continues until all objects to be reviewed have been exercised.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 3 illustrates one example of a computing environment in which embodiments of the present invention may be implemented.

DETAILED DESCRIPTION OF EMBODIMENTS OF INVENTION

Figure 1:
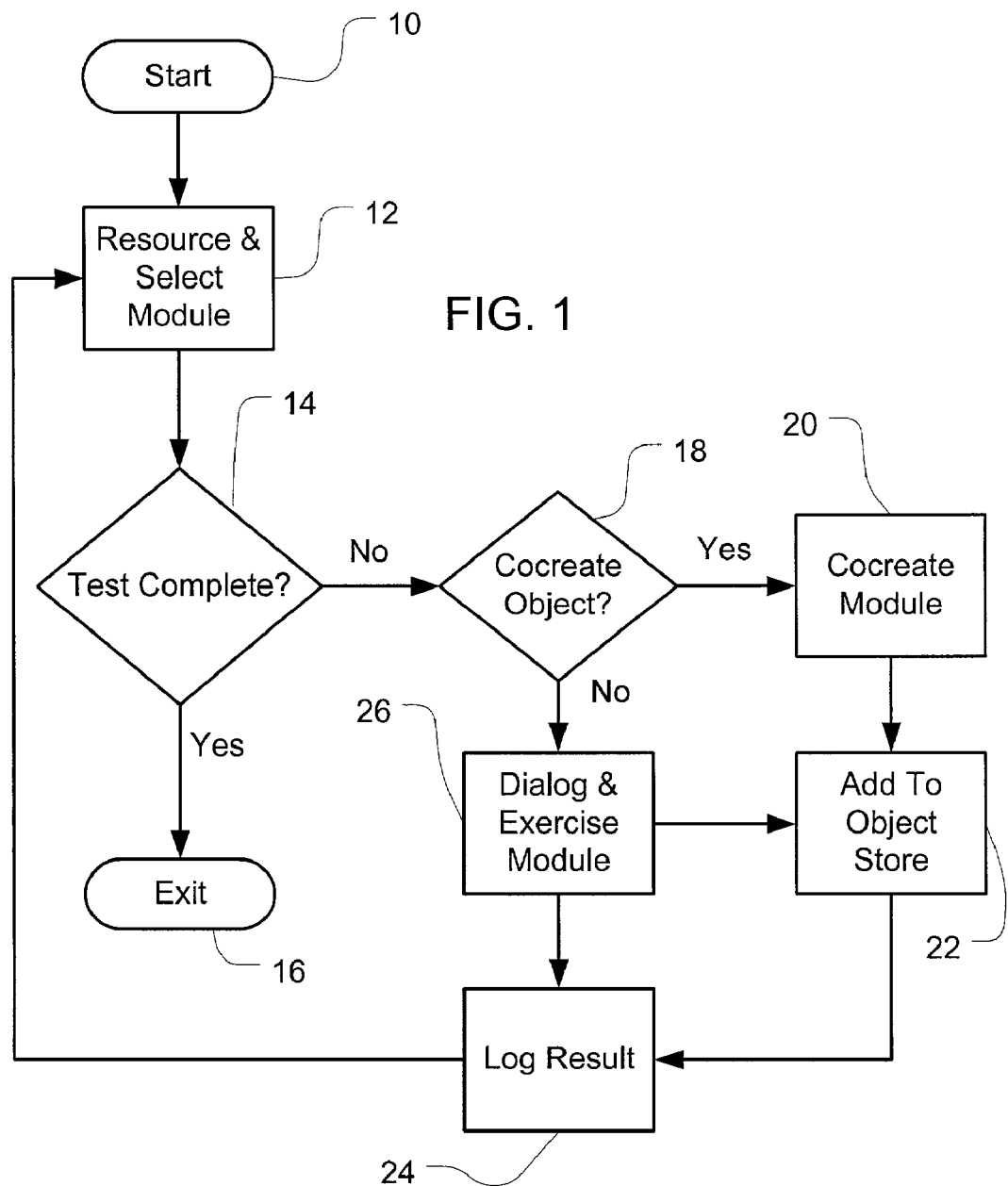
FIG. 1 shows an operational flow of logical operations performed by the universal routine in the selection and exercising of objects in accordance with one embodiment of the present invention.
Figure 2:
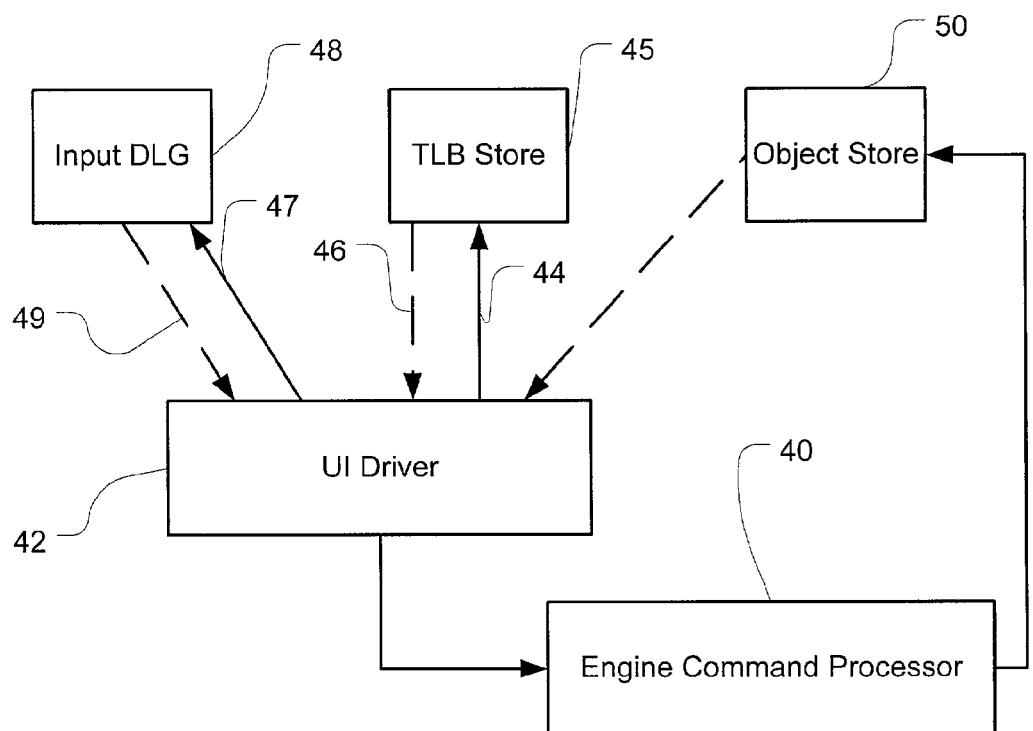
FIG. 2 illustrates the data flow between architectural elements of a system in which the operations of FIG. 1 are performed.

The operational flow of logical operations of the universal routine for reviewing and testing objects in one embodiment of the invention is shown in FIG. 1. The operative elements used in performing the logical operations and the data flow between operative elements are shown in FIG. 2. The operational flow of the universal routine is entered from the main program through start connector 10. Resource and select module 12 retrieves the information available about the objects under review including the objects, their interfaces, methods and parameters. Engine command processor 40 and user interface driver 42 in FIG. 2 work together to perform the operations in FIG. 1. The user interface driver 42 sends requests 44 to the type library (TLB) store 45 and the TLB store replies 46 with COM objects, methods and parameters. Resource and select module 12 also retrieves user input to the operational flow that indicates the object selected for the review, whether the object is to be cocreated or an instance or copy already exists, and what method is to be invoked to exercise the object. In this regard, the user interface driver 42 sends requests 47 to the input dialog (DLG) 48 and the input DLG 48 replies 49 with object and method selections and commands from the user/reviewer.

In an alternative embodiment, the manual input might be replaced by a XML file input to the engine command processor 40. Further, the engine command processor might generate an XML file output effectively automating the testing operation.

Test complete operation 14 performed in the engine command processor 40 detects whether more objects are to be exercised or more methods on a selected object are to be invoked. If all of the objects have been exercised, and if no further selections are provided by the resource and select module 12, the operation flow branches YES to exit connector 16. The operational flow in this situation returns to the main program. If the test complete operation 14 detects there are more objects to be exercised either because another object has been selected or a method or more parameters have been selected, the operation flow branches NO to cocreate test operation 18.

Cocreate test operation 18 is testing whether the object under review has to be cocreated or is already in an object store 40 (FIG. 2) ready to be exercised. If an instance of the object under review has not been created for the exercise, then the operational flow branches YES to cocreate module 20. Cocreate module 20 creates an instance of the object under review. The instance of the object is stored in the object store 50 by the engine command processor 40 using add-to-object-store operation 22. The addition of the object under review to the object store is logged by log result operation 24, and the result is stored in log file 52. The operation flow then returns to resource and select module 12 for more information to be retrieved in the review and test operations.

If an instance of the object under review is already in the object store, the operational flow branches NO from cocreate test operation 18 to dialog and exercise module 26. Module 26 retrieves the selected object (instance of object under review) from the object store and the selected method for exercising the selected object. Module 26 then displays a dialog box to the reviewer providing appropriate parameter choices for the selected object and method. After the reviewer makes the parameter choices, module 26 retrieves the choices and invokes the selected method on the selected object using the parameter choices. A possible result of invoking the method may be the creation of another object. If so, module 26 calls add-to-object-store operation 22 which adds the new object to object store 50. If the result of invoking the method produces a result from exercising the object without creating a new object, the result of the exercise is logged in log file 52 by log result operation 24. The operational flow then returns to the resource and select module 12 for more selections by the reviewer. When all reviews and tests of the objects in the program have been completed, the operational flow branches YES to exit connector 16.

FIG. 3 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing system, environments, and/or configuration that may be suitable for use with the invention include, but are not limited to, personal computers, server computers, land-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architectures (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131, RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

A computing device, such as computing system 100, typically includes at least some form of computer-readable media. Computer readable media can be any available media that can be accessed by the computing system 100. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
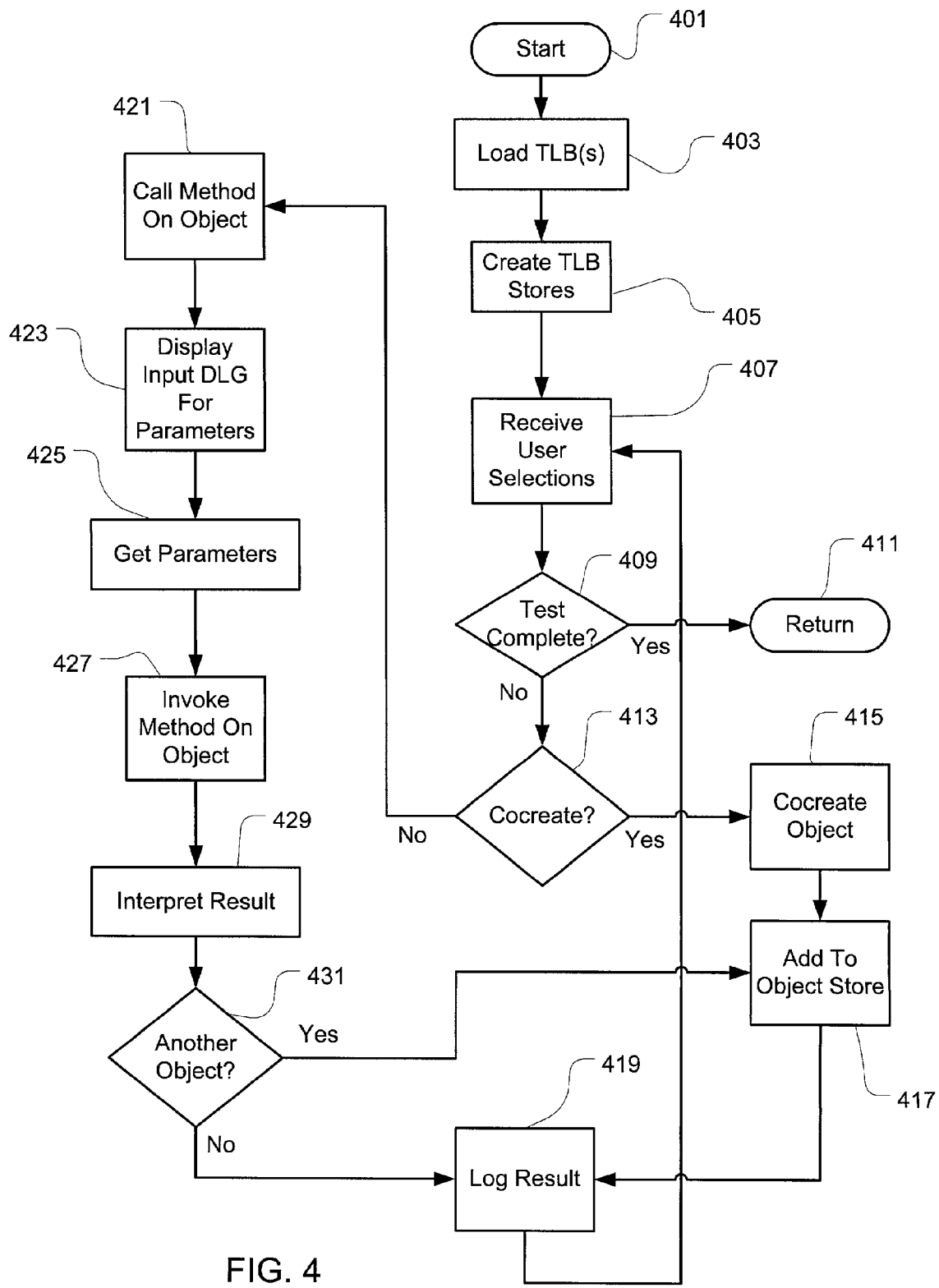
FIG. 4 shows an operational flow of logical operations to perform the selection and exercising of objects in accordance with another embodiment of the invention.

In FIG. 4, the operational flow of another embodiment of the invention for exercising an object enters at start terminal 401. Load operation 403 parses TLBs (type library) into information about a component. A component is an object that encapsulates both data and code, and provides a well-specified set of available services. A component for example might be a COM object. The type libraries are files storing information about interfaces, formal parameters, methods, enumerations, constants, and other attributes of a component. The logical operations illustrated in the operational flow of FIG. 4 are processed in processing engine 40 and the user interface driver 42 in FIG. 2. Create TLB store operation 405 builds the TLB store in order to cache parsed information from the TLBs for easier use later in the operations of the universal routine for reviewing and testing objects. Receive operation 407 receives a user input whereby the user can control the exercising of an object. These user inputs allow the user to select whether the object is to be cocreated, whether an object is available from the object store, and what method is to be executed in exercising the object.

From the receive operation 407, the decision operation 409 tests whether there are more object exercises remaining. If the exercising of objects is complete, the operational flow branches YES to the return terminal 411 which returns program control to the calling or main program that called the exercise operations. If the exercise of the COM object is not complete, then operational flow branches NO to cocreate test operation 413 to detect whether the user has selected an object that must be cocreated to be exercised. If the user input specifies an object to be cocreated, then the operational flow branches YES from operation 413 to cocreate operation 415.

Cocreate operation 415 creates an instance of the object to be exercised, and store operation 417 adds the cocreated object to the object store 50 in FIG. 2. After the cocreated object is in the object store, the operational flow passes to log operation 419 that logs the co-creation addition of the object to the object store. From log operation 419, the operational flow returns to the receive selections operation 407. Receive operation 407 will be looking to see if the next user input is another co-creation of an object for exercising or whether the user has selected an object from the object store to be exercised. Receive selections operation 407 will also be looking to see whether the user has specified any method for exercising the object. Since the exercising of objects is not complete, the operational flow branches NO through decision operation 409 to cocreate test operation 413.

Assuming the user input was the selection of an object from the object store and the identification of a method for exercising the object, the operational flow will branch NO from cocreate test operation 413 to call method operation 421. Call method operation 421 calls the selected method on the selected object from the object store 50. Display operation 423 renders the input dialogue window for the user to indicate parameter choices for exercising the selected object.

Figure 5:
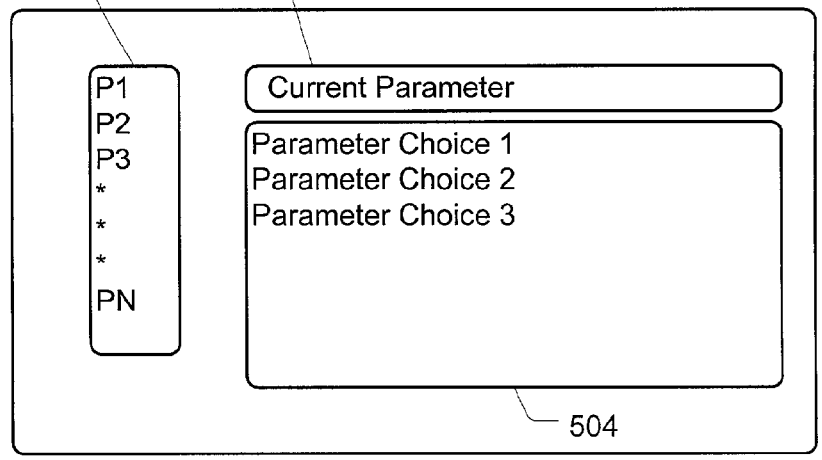
FIG. 5 illustrates the dialog box displayed by operation 423 in FIG. 4 whereby the user/reviewer selects parameters for use by the method in exercising the object under review.

An example of the dialogue window is illustrated in FIG. 5. In FIG. 5, the dialogue box 502 lists the formal parameters available for exercising the COM object. Once a formal parameter is selected, the choices for the actual parameter appear in dialogue box 504. The user may then choose the actual parameter from those displayed in dialogue box 504, and the choice will appear as the current parameter choice in dialogue box 506. Get operation 425 gets the parameters selected by the user in using the input dialogue window of FIG. 5. When get operation 425 has retrieved the parameters, invoke operation 427 invokes the method to exercise the selected object in accordance with the chosen method and the parameters retrieved in operation 425. Operation 429 interprets the result of the method exercising the object. These results may be the exercising of the selected object or the exercised object may have created another object and specified available methods, parameters and a timestamp.

If the result of invoking the method on the object being exercised is the creation of another object, detect operation 431 will detect the creation of an additional object or the additional object so that operation flow branches YES to store operation 417. Store operation 417 adds the additional object to the object store. From store operation 417, the operational flow passes to log operation 419 to log the operation, the parameters and the result; in this case, an additional object in the object store 50 produced by invoking the method on the object being exercised in operation 427. If the result interpreted in interpret operation 429 is the performance of the selected method on the selected object given the selected parameters and does not result in the creation of another object, then the operational flow passes through detect operation 431 and branches NO to log operation 419. In this situation, log operation 419 logs in log file 52 the operation, the parameters and the result of exercising the object with the parameters chosen. When the log operation 419 is complete, the operational flow returns to receive user input 407 operation. If there is no additional user input, detect operation 409 tells whether all objects have been tested and if so the operational flow exits at 411. The reviewer may then examine log file 52 to debug or adjust the objects being reviewed and tested.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein have been referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Thus, the present invention is presently embodied as a method, apparatus, computer program product or computer readable media encoding a computer program for reviewing and testing objects in a computer program. While the invention has been particularly shown and described with reference to preferred embodiments thereof, it will be understood by those skilled in the art that various other changes in the form and details may be made therein without departing from the spirit and scope of the invention.

What is claimed is:

1. A method for reviewing operation of software objects of a computer program, definitions of the software objects being stored in a library, the definitions including methods of the objects and formal parameters for the methods, the method comprising the acts of:

receiving from a user an indication of an object defined in the library to be exercised;

receiving an indication of whether the object is to be created or already exists in an object store because the object was previously instantiated;

when the object is to be created, instantiating the object for review based on the definition of the object stored in the library and adding that object to the object store;

retrieving from an input dialog a selected method for exercising the instantiated object, the input dialog identifying methods of the object based on the definition of the object stored in the library;

obtaining an actual parameter corresponding to formal parameters specified in the definition of the object stored in the library for use in exercising the instantiated object; and invoking the selected method of the instantiated object using the actual parameter so that the operation of the software object is reviewed; and when the invoked method creates another object, adding that object to the object store so that a user can review the operation of that other object.

2. The method of claim 1 wherein the library is a type library.

3. The method of claim 1 wherein the library is a type library and the act of obtaining comprises:

displaying an input dialog for a user to choose parameters using information stored in the type library.

4. A method for creating a log record of a plurality of COM objects exercised by methods and parameters associated with each of the COM objects, the method comprising:

parsing COM object information into methods and parameters for each COM object;

storing the methods and parameters in a library store;

detecting an input selection indicating an object to be exercised;

receiving an indication of whether to create a new instance of the object or to use an existing instance of the object that is stored in an object store;

when a new instance of the object is to be created, creating an instance of the object to be exercised and adding the new instance of the object to the object store;

getting the method and parameters chosen for use with the method to exercise the instance of the object;

invoking the method with a chosen parameters to exercise the instance of the object to be exercised;

when the invoked method creates an instance of another object, adding that instance to the object store so that the instance of the other object can be exercised based on an input selection;

logging the result of the exercising the instance of the object; and repeating the detecting, creating, getting, invoking, determining, and logging acts to create a log record of the plurality of COM objects for use in debugging and adjusting the operation of the COM objects.

5. The method of claim 4 wherein the library is a type library.

6. The method of claim 4 further comprises:

interpreting operations performed in exercising the instance of the object; and generating a result based upon the operations performed.

7. A computer-readable storage medium containing instructions for controlling a computer system to test a software object, by a method comprising:

receiving from a user an indication to test an instance of an object;

when the user indicates to test a new instance of the object that does not exist in an object store because of a previous instantiation, instantiating the object, and adding the instance of the object to the object store; and exercising the instance of the object by repeatedly:

displaying to a user a list of methods of the object;

receiving from the user a selection of a method;

receiving from the user actual parameters for the selected method; and invoking the selected method of the instance of the object passing the actual parameters determining whether the invoked method instantiates an instance of another object, and when it is determined that the invoked selected method instantiates another object, adding the instance of the other object to the object store so that the instance of the other object can be tested until the methods of the instance of the object are tested.

8. The computer-readable storage medium of claim 7 including retrieving information from a type library that describes methods of the object.

9. The computer-readable storage medium of claim 7 wherein selection of the method and actual parameters are provided by an input dialog.

10. The computer-readable storage medium of claim 7 including repeating the instantiating and exercising for the instance of the other object.

11. The computer-readable storage medium of claim 7 including logging the selection of the method and the actual parameters.

12. The computer-readable storage medium of claim 11 including logging results of the invocation.

13. A computer-readable storage medium containing instructions for controlling a computer system to test software objects, each object having methods, each method having one or more formal parameters, by a method comprising:

providing entries that specify an object, whether an instance of the object should be created or chosen from among instances of the object in the object store, a method of the object, and an actual parameter of the method; and for each entry, when the entry specifies that an instance of the object is to be created, instantiating the object of the entry specified in the entry, selecting the instance of the object, and storing the instance of the object in an object store;

when the entry specifies that an instance of the object is to choose from among instances of the object in the object store and selecting an instance of the object from the object store;

invoking the method of the entry of the selected instance of the object passing the actual parameter of the entry;

when the invoked method instantiates another object, adding the instance of the other object to the object store so that the instance of the other object can be tested; and logging results of the invocation.

14. The computer-readable storage medium of claim 13 wherein the entries are provided in a file.

15. The computer-readable storage medium of claim 13 wherein the entries are provided by a tester via an input dialog during testing of objects.

16. The computer-readable storage medium of claim 13 including for an object, retrieving information from a type library that describes methods and their formal parameters of the object.

17. The computer-readable storage medium of claim 13 wherein an entry includes multiple actual parameters.

* * * * *